(12) United States Patent
Smith

(10) Patent No.: US 8,412,125 B2
(45) Date of Patent: Apr. 2, 2013

(54) WIRELESS COMMUNICATION SYSTEM WITH TRANSMIT DIVERSITY DESIGNS

(75) Inventor: Richard L. Smith, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 908 days.

(21) Appl. No.: 11/866,977

(22) Filed: Oct. 3, 2007

(65) Prior Publication Data

US 2008/0090529 A1 Apr. 17, 2008

Related U.S. Application Data

(60) Provisional application No. 60/851,629, filed on Oct. 13, 2006.

(51) Int. Cl.
*H03C 7/02* (2006.01)

(52) U.S. Cl. ........ 455/101; 455/103; 455/104; 455/500; 455/501; 455/59; 455/63.3; 455/553.1; 375/130; 375/141; 375/146; 375/267; 375/299; 370/207; 370/204; 370/209; 370/330

(58) Field of Classification Search .......... 455/101, 455/103, 104, 500, 501, 59, 63.3, 550.1, 455/553.1; 375/299, 267, 146, 141, 130; 370/207, 204, 209, 330
See application file for complete search history.

(56) References Cited

U.S. PATENT DOCUMENTS

| | | | | |
|---|---|---|---|---|
| 3,662,268 A | * | 5/1972 | Gans et al. | 455/504 |
| 5,652,764 A | * | 7/1997 | Kanzaki et al. | 375/130 |
| 5,983,081 A | | 11/1999 | Lehtinen | |
| 6,006,075 A | * | 12/1999 | Smith et al. | 455/101 |
| 6,026,307 A | | 2/2000 | Blom et al. | |
| 6,088,003 A | * | 7/2000 | Bassirat | 343/890 |
| 7,139,324 B1 | * | 11/2006 | Ylitalo et al. | 375/267 |
| RE40,434 E | * | 7/2008 | Dearnley et al. | 343/817 |
| 7,430,430 B2 | * | 9/2008 | Li et al. | 455/522 |
| 7,711,030 B2 | * | 5/2010 | Perlman | 375/141 |
| 2003/0020651 A1 | | 1/2003 | Crilly, Jr. et al. | |
| 2004/0160372 A1 | | 8/2004 | Pulver | |
| 2005/0175073 A1 | * | 8/2005 | Pajukoski et al. | 375/146 |
| 2005/0276348 A1 | * | 12/2005 | Vandenameele | 375/299 |
| 2006/0087476 A1 | | 4/2006 | Piburn et al. | |

OTHER PUBLICATIONS

PCT International Search Report and Written Opinion of the International Searching Authority, Mar. 11, 2008.

* cited by examiner

*Primary Examiner* — Junpeng Chen

(57) ABSTRACT

An apparatus for enabling a base station to transmit radio frequency signals with a transmit diversity technique comprises a first antenna implemented in the base station; and a second antenna implemented in the base station, and placed apart from the first antenna by a predetermined distance. The first antenna utilizes a first frequency band of a predetermined frequency spectrum for transmitting signals, and the second antenna utilizes a second frequency band of the predetermined frequency spectrum for transmitting signals. The first and second frequency bands do not overlap.

17 Claims, 3 Drawing Sheets

WIRELESS COMMUNICATION SYSTEM WITH TRANSMIT DIVERSITY DESIGNS

CROSS REFERENCE

The present application claims the benefit of U.S. Provisional Application Ser. 60/851,629, filed Oct. 13, 2006.

BACKGROUND

The present invention relates generally to a wireless communication system, and more particularly to a wireless communication system with transmit diversity designs.

Antenna diversity is a technique in which an information-carrying signal is transmitted via a number of propagation paths in a wireless communication system. The antenna diversity technique can be further categorized into receive diversity, transmit diversity, and multiple-input-multiple-output (MIMO) schemes, depending on the number of antennas used at the signal receiving end or the signal transmitting end. The receive diversity refers to a system where the signal receiving end employs multiple antennas to receive multipath signals from the transmitting end implemented with one antenna. The transmit diversity refers to a system where the signal transmitting end employs multiple antennas to transmit signals via multiple paths to the receiving end implemented one antenna. The MIMO scheme refers to a system where both the transmitting and receiving ends employ multiple antennas to transmit or receive signals via multiple paths.

A typical wireless communication system usually employs the receive diversity technique to improve the quality of the signal reception. Conventionally, the receive diversity technique can be implemented in a base station with many different approaches. The most common approach is placing antennas of similar polarization at the same elevation with the same azimuth by a predetermined space. These separately placed antennas receive signals from multiple paths, and therefore reduce the probability that all of the antennas are blocked from receiving signals as opposed to a system with only one receive antenna. Another common approach is placing two antennas orthogonal in polarization at the same location for signal reception. When either of these approaches is properly implemented, improvement in uplink signal reception is noticeable.

Although receive diversity is commonly implemented at base stations in wireless communication systems, transmit diversity is not as commonly used. A base station usually has sufficient real estate for accommodating multiple antennas, whereas, for cost considerations, a mobile unit often has only one antenna supported by a single amplifier. As a result, a base station implemented with receive diversity needs to switch to a single antenna mode during transmission in order to accommodate the single-antenna mobile units.

FIG. 1 illustrates a conventional wireless communication system 100 comprised of at least one base station 102 and at least one mobile unit 104. The base station 102 includes multiple antennas 106 and 108 coupled to a combiner 114, which is further coupled to power amplifiers 110 and 112. When the base station 102 is in a signal reception mode, its antennas 106 and 108 receive uplink signals transmitted from an antenna 116 of the mobile unit 104 through multiple propagation paths. The combiner 114 then passes the signals received at the antennas 106 and 108 to the power amplifiers 110 and 112 for signal amplification for further processing. When the base station is in a signal transmission mode, the transmit diversity technique cannot be applied because the mobile unit 104 with only one antenna 116 does not support it. As a result, the combiner 102 would combine outputs of the power amplifiers 110 and 112 into one radio frequency (RF) signal, and select one of the antennas 106 and 108 for transmission.

One drawback of the conventional wireless communication system as shown, for example, in FIG. 1, is that it suffers from poor quality of downlink signal reception due to reasons, such as fading, as it does not utilize the transmit diversity technique. Another drawback of the conventional wireless communication system as shown, for example, in FIG. 1, is that it requires a combiner 114 coupled between the antennas 106, 108 and the power amplifiers 110, 112, in order to support a single antenna transmission mode. As a result, the system design is complicated, and its cost is increased.

What is needed is a wireless communication system with a simplified design that supports both the receive diversity and transmit diversity techniques.

SUMMARY

The present invention is directed to an apparatus for enabling a base station to transmit radio frequency signals with a transmit diversity technique. In one embodiment of the present invention, the apparatus comprises a first antenna implemented in the base station; and a second antenna implemented in the base station, and placed apart from the first antenna by a predetermined distance. The first antenna utilizes a first frequency band of a predetermined frequency spectrum for transmitting signals, and the second antenna utilizes a second frequency band of the predetermined frequency spectrum for transmitting signals. The first and second frequency bands do not overlap.

The construction and method of operation of the invention, however, together with additional objectives and advantages thereof will be best understood from the following description of specific embodiments when read in connection with the accompanying drawings.

DESCRIPTION

Figure 1:
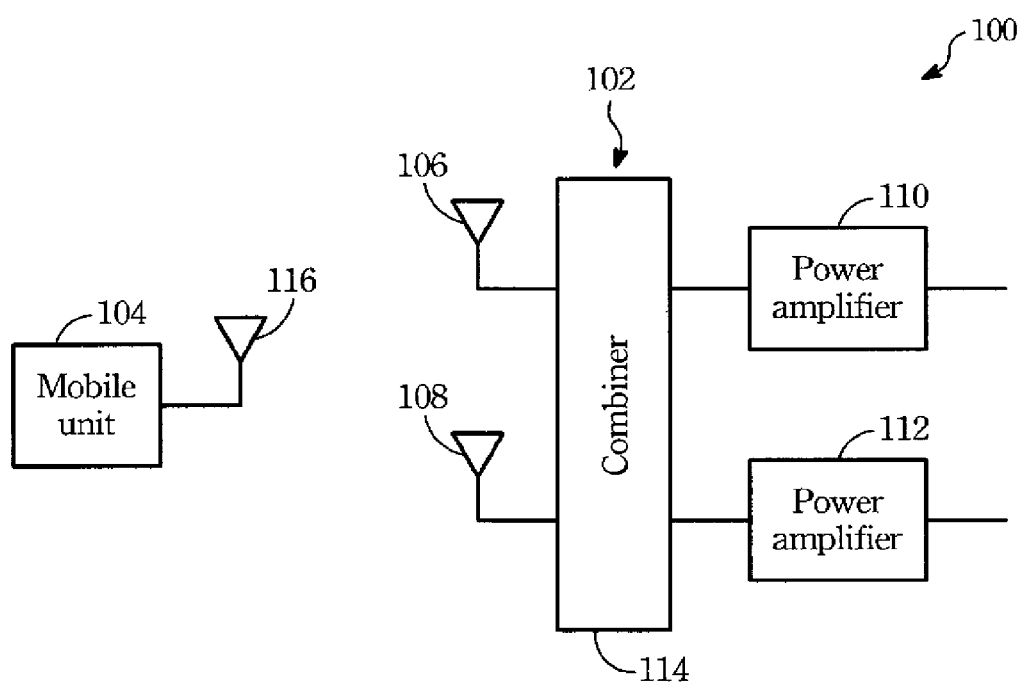
FIG. 1 illustrates a conventional wireless communication system where a base station is implemented with multiple antennas in support for the receive diversity technique.

Those skilled in the art recognize that the current, straight forward approaches that are used for receive diversity are not applicable for transmit diversity. Transmit diversity techniques are not straight forward and each approach is unique to the wireless network and modulation scheme that is implemented. The purpose of the examples presented herein are to provide another approach for transmit diversity.

For a wide band network that deploys mobiles or modems that utilize a single low noise amplifier block, the approach that is proposed herein is to split the spectrum equally between the two antennas that are either spaced apart by ten or more wavelength or are housed in a single enclosure but have orthogonal polarizations. In either case, the radiation pattern in a free space environment will be smooth and vary less than half the peak radiation intensity over the desired field of view. Furthermore, in a multi-path environment, the fading nulls from the pair of antennas will have very little correlation. This follows to reason that the mobile or modem will have a very low probability of being in a fading null from both antennas.

In one example, there are two transmit antennas placed more than 10 wavelengths apart from one another and that are of similar polarization. For communication signals that are broadcast to all mobiles or modems, the lower half of the frequency spectrum for the signals is transmitted from one of the two antennas and the upper half of the frequency spectrum for the signals is transmitted from the other antenna. In this case, there is no constructive or destructive interference between the signals transmitted by the two antennas. If the two antennas are co-located but orthogonal in polarization, then the spectrum can be split as in the previous case with a similar result. If the entire spectrum is transmitted from both antennas in either case, there will be an interaction between the two radiated signals as well as the fading caused by the multi-path environment. The implementation of this idea avoids the complication of combining the output of the two power amplifiers, one behind each antenna, into a single RF path that is then transmitted out of a single antenna. This idea reduces the complexity of the calibration requirements for the basestation and eliminates the hardware that is necessary for implementing the combining process between the power amplifiers and the antennas. Also, if only one antenna is used for transmitting the signal, then there are fading nulls in the coverage region where none of the signal is present.

This invention describes an apparatus for enabling a base station to transmit signals with the transmit diversity technique. The following merely illustrates various embodiments of the present invention for purposes of explaining the principles thereof. It is understood that those skilled in the art will be able to devise various equivalents that, although not explicitly described herein, embody the principles of this invention.

Figure 2:
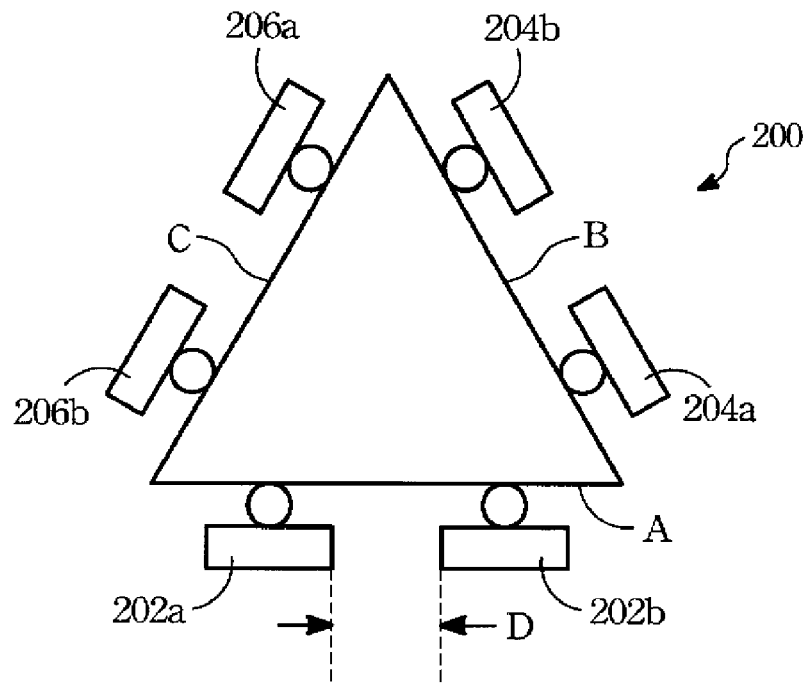
FIG. 2 illustrates a top view of an antenna tower of a base station in accordance with one embodiment of the present invention.

FIG. 2 illustrates a top view of an apparatus comprising an antenna tower 200 and multiple antennas 202a, 202b, 204a, 204b, 206a, and 206b implemented in a base station (not shown in the figure) in accordance with one embodiment of the invention. The antenna tower 200 has a triangular shape with a pair of antennas mounted on each face, wherein the antennas 202a and 202b are mounted on face A, the antennas 204a and 204b are mounted on face B, and the antennas 206a and 206b are mounted on face C. The antennas mounted on the same face of the antenna tower 200 are placed apart from each other by a predetermined distance D.

In the signal reception mode, the base station employs the receive diversity technique, and the antennas 202a, 202b, 204a, 204b, 206a and 206b cover a wide range of signal paths, thereby improving the quality of signal reception against multi-path or fading. For example, the antennas 202a and 202b receive signals from a mobile unit (not shown in the figure) at the same time. At one moment during the signal transmission, an object moves in between the antenna tower 200 and the mobile unit, and blocks the signal path from the mobile unit to the antenna 202a. In such case, although signal reception of the antenna 202a is blocked, the antenna 202b continues to receive signals from the mobile unit and therefore ensures the reception quality.

In the signal transmission mode, the base station employs the transmit diversity technique without requiring the mobile unit to have multiple antennas. For example, the antennas 202a and 202b establish a downlink, which occupies a predetermined frequency spectrum, with a mobile unit. The antennas are used to transmit signals having a frequency spectrum. The antenna 202a utilizes a first frequency band of the predetermined spectrum for transmission of a first half of the frequency spectrum of the signals, and the antenna 202b utilizes a second frequency band of the predetermined spectrum for transmission of a second half of the frequency spectrum of the signals, wherein the first and second frequency bands do not overlap. As a result, the interference between the signals transmitted by the antennas 202a and 202b can be reduced, thereby ensuring the signal quality at the mobile unit. The predetermined distance D is preferably set to be larger than at least ten times of the wavelength of a signal transmitted from the antennas 202a and 202b in order to avoid interference. In some cases, the predetermined distance can be over twenty times of the wavelength of a signal transmitted from the antennas 202a and 202b.

Figure 3:
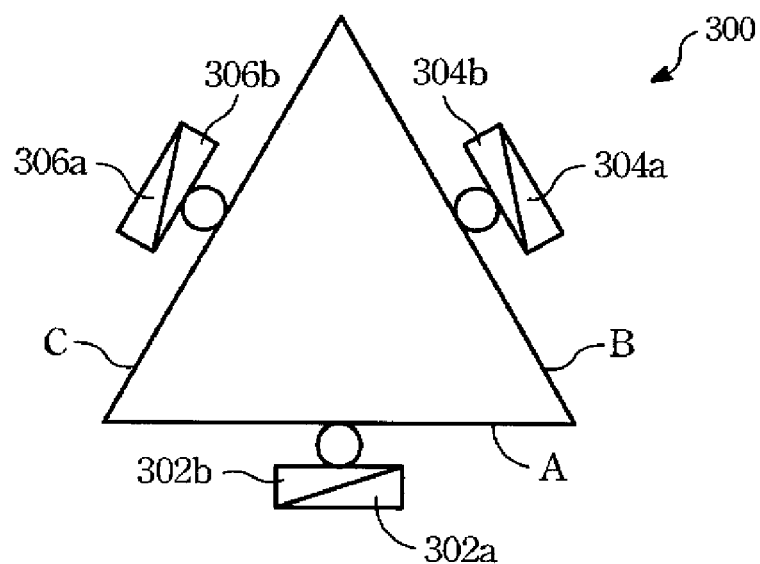
FIG. 3 illustrates a top view of an antenna tower of a base station in accordance with another embodiment of the present invention.

The antenna placement and frequency allocations may vary without departing the spirit of the invention. For example, the number of antennas used for establishing a downlink can be greater than two, as long as the frequency bandwidths used by each antenna do not overlap. The frequency bandwidths of the antennas do not need to be equally divided, either. For example, the frequency bandwidth of the antenna 202a can be broader than that of the frequency bandwidth of the antenna 202b. In addition, the frequency bands of the antennas 202a and 202b can have an interval inserted there between to further reduce the interference. FIG. 3 illustrates a top view of an apparatus comprising an antenna tower 300 and multiple antennas 302a, 302b, 304a, 304b, 306a and 306b implemented in a base station (not shown in the figure) in accordance with one embodiment of the invention. The antenna tower 300 has a triangular shape with a pair of antennas mounted on each face, wherein the antennas 302a and 302b are mounted on face A, the antennas 304a and 304b are mounted on face B, and the antennas 306a and 306b are mounted on face C. The antennas mounted on the same face of the antenna tower 300 are placed at the same location with their polarization being orthogonal.

In the signal reception mode, the base station employs the receive diversity technique with the antennas 302a, 302b, 304a, 304b, 306a and 306b to improve the quality of signal reception. In the signal transmission mode, the base station employs the transmit diversity technique without requiring the mobile unit to have multiple antennas. For example, the antennas 302a and 302b establish a downlink, which occupies a predetermined frequency spectrum, with a mobile unit. The antennas are used to transmit signals having a frequency spectrum. The antenna 302a utilizes a first frequency band of the predetermined spectrum for transmission of a first half of the frequency spectrum of the signals, and the antenna 302b utilizes a second frequency band of the predetermined spectrum for transmission of a second half of the frequency spectrum of the signals, wherein the first and second frequency bands do not overlap. Although the antennas 302a and 302b are placed in the same location, the interference between the two can be avoided as they are orthogonal in polarization.

It is noted that although the above embodiments utilize a triangular signal tower as an example for explaining various embodiments of the invention, the antenna tower can have different shapes. It is also noted that in either embodiment above, the improvement of signal transmission is noticeable.

Figure 4:
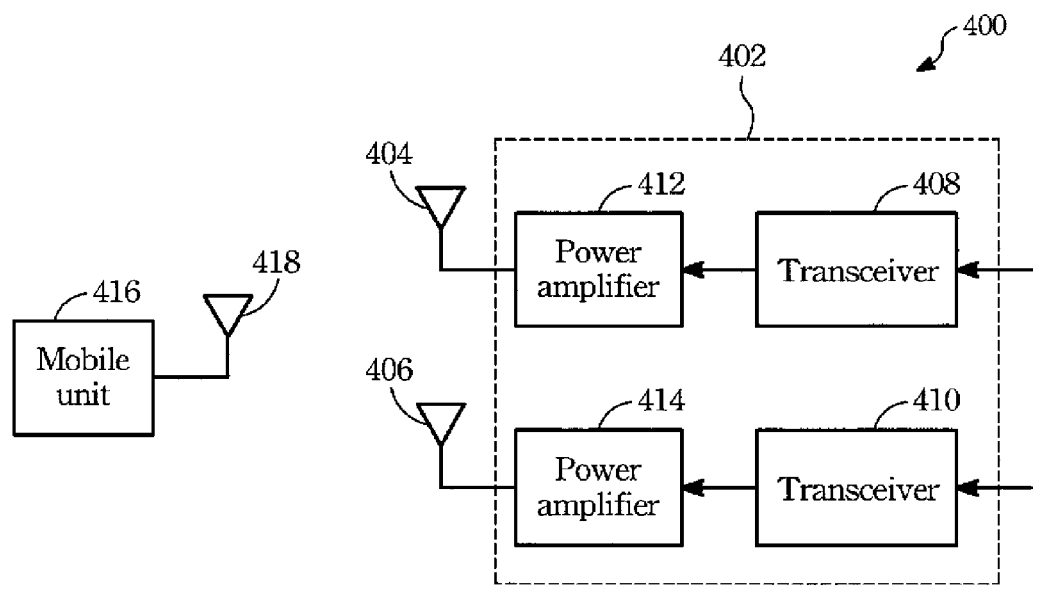
FIG. 4 illustrates a wireless communication system where a base station is implemented with multiple antennas in support for both transmit and receive diversity techniques.

FIG. 4 illustrates a wireless communication system 400 where a base station 402 is implemented with multiple antennas 404 and 406 in support for both the transmit and receive diversity techniques in accordance with one embodiment of the invention. The base station 402 comprises, for example, transceivers 408 and 410, and power amplifiers 412 and 414, coupled to the antennas 404 and 406, respectively. In signal transmission, the transceiver 408 and 410 receive input signals having a frequency spectrum, and converts the signals into radio frequency signals as outputs to the power amplifiers 412 and 414. The antennas 404 and 406 then transmit the amplified signals to the mobile unit 416 via a downlink with its antenna 418. More specifically, transceiver 408 transmits, via antenna 404, a first half of the frequency spectrum of the input signals, while transceiver 410 transmits, via antenna 406, a second half of the frequency spectrum of the input signals. The placement and the design of the antennas 404 and 406 are described in the above embodiments of the present invention.

One advantage of the present invention is that the multiple antennas implemented in the base station can be fully utilized for both receive and transmit diversity techniques. This results in a smooth radiation pattern and reduced peak radiation intensity in a free space environment. This also results in an increased probability of signal reception against multipath and fading.

Another advantage of the present invention is its simplicity in design. Because the multiple antenna implemented in the base station can be fully utilized for both receive and transmit diversity techniques, no additional combiner is needed to combine outputs from power amplifiers when the base station transmits signals to the mobile unit.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. An apparatus comprising:
   a first antenna;
   a second antenna;
   a first transceiver coupled to the first antenna; and
   a second transceiver coupled to the second antenna, wherein the first and second transceivers are configured to receive as inputs, signals having a frequency spectrum including first and second non-overlapping frequency portions, and wherein the first transceiver is configured to transmit to a destination device only the first frequency portion of the signals using a first frequency band of a predetermined spectrum via the first antenna and wherein the second transceiver is configured to transmit to the destination device only the second frequency portion of the signals using a second frequency band of the predetermined spectrum via the second antenna;
   wherein the first and second frequency bands do not overlap.

2. The apparatus of claim 1, wherein the first frequency band and the second frequency band have the same width.

3. The apparatus of claim 1, wherein the first frequency band and the second frequency band have unequal widths.

4. The apparatus of claim 1, wherein the first transceiver and the second transceiver are configured to transmit the first and second frequency portions of the signals in the first and second frequency bands, respectively, such that there is a predetermined frequency interval between the first frequency band and the second frequency band.

5. The apparatus of claim 1, wherein the first frequency portion comprises a first half of the frequency spectrum and the second frequency portion comprises a second half of the frequency spectrum.

6. The apparatus of claim 1, wherein the first and second antennas are spaced apart by a predetermined distance that is greater than ten times a wavelength of a signal transmitted by the first antenna or the second antenna.

7. The apparatus of claim 1, wherein the first antenna and the second antenna are mounted at the same location on an antenna tower and have polarizations that are orthogonal to each other.

8. A system comprising:
   a mobile unit; and
   a base station configured to receive signals from and transmit signals to the mobile unit, the base station comprising:
   a first antenna;
   a second antenna;
   a first transceiver coupled to the first antenna; and
   a second transceiver coupled to the second antenna, wherein the first and second transceivers are configured to receive as inputs, signals having a frequency spectrum including first and second frequency portions, wherein the first frequency portion is in a first half of the frequency spectrum and the second frequency portion is in a second half of the frequency spectrum, and wherein the first transceiver is configured to transmit to a destination device only the first frequency portion of the signals using a first frequency band of a predetermined spectrum via the first antenna and wherein the second transceiver is configured to transmit to the destination device only the second frequency portion of the signals using a second frequency band of the predetermined spectrum via the second antenna;
   wherein the first and second frequency bands do not overlap.

9. The system of claim 8, wherein the first frequency band and the second frequency band have the same width.

10. The system of claim 8, wherein the first transceiver and the second transceiver are configured to transmit the first and second frequency portions of the signals in the first and second frequency bands, respectively, such that there is a predetermined frequency interval between the first frequency band and the second frequency band.

11. The system of claim 8, wherein the first frequency portion comprises a first half of the frequency spectrum and the second frequency portion comprises a second half of the frequency spectrum.

12. The system of claim 8, wherein the first and second antennas are spaced apart by a predetermined distance that is greater than ten times a wavelength of a signal transmitted by the first antenna or the second antenna.

13. The system of claim 8, wherein the first antenna and the second antenna are mounted at the same location on an antenna tower and have polarizations that are orthogonal to each other.

14. The system of claim 8 wherein the base station comprises a first amplifier configured to amplify signals received from the first transceiver prior to transmission via the first antenna and a second amplifier configured to amplify signals received from the second transceiver prior to transmission via the second antenna.

15. A method comprising:

receiving at first and second transceivers of a wireless communication device input signals having a frequency spectrum including first and second non-overlapping frequency portions;

transmitting to a destination device only the first frequency portion of the signals via a first antenna of the wireless communication device in a first frequency band of a predetermined spectrum; and transmitting to the destination device only the second frequency portion of the signals via a second antenna of the wireless communication device in a second frequency band of the predetermined spectrum;

wherein the first frequency band and the second frequency band and do not overlap.

16. The method of claim 15, wherein the first frequency portion comprises a first half of the frequency spectrum and the second frequency portion comprises a second half of the frequency spectrum.

17. The method of claim 15, wherein the first and second frequency bands have unequal widths.

* * * * *